United States Patent
Kulperger

(10) Patent No.: US 7,238,287 B2
(45) Date of Patent: Jul. 3, 2007

(54) METHOD FOR PROVIDING SAFE, CLEAN CHLORINATED RECREATIONAL WATER

(75) Inventor: Robert Kulperger, New York, NY (US)

(73) Assignee: Natural Chemistry, Inc., Stamford, CT (US)

(*) Notice: Subject to any disclaimer, the term of this patent is extended or adjusted under 35 U.S.C. 154(b) by 221 days.

(21) Appl. No.: 10/937,263

(22) Filed: Sep. 10, 2004

(65) Prior Publication Data

US 2006/0054569 A1 Mar. 16, 2006

(51) Int. Cl.
*C02F 1/467* (2006.01)

(52) U.S. Cl. .................. 210/632; 205/618; 205/742; 210/698; 210/721; 210/724; 210/728; 210/748; 210/754; 210/764; 252/181

(58) Field of Classification Search .......... 210/755
See application file for complete search history.

(56) References Cited

U.S. PATENT DOCUMENTS

| | | | | |
|---|---|---|---|---|
| 3,937,613 A | * | 2/1976 | Rosicky | 422/57 |
| 5,362,368 A | * | 11/1994 | Lynn et al. | 205/335 |
| 5,503,766 A | * | 4/1996 | Kulperger | 510/383 |
| 6,120,698 A | * | 9/2000 | Rounds et al. | 252/181 |
| 6,207,177 B1 | * | 3/2001 | Jany | 424/405 |
| 6,524,487 B2 | * | 2/2003 | Kulperger et al. | 210/723 |
| 6,562,243 B2 | * | 5/2003 | Sherman | 210/754 |
| 6,727,219 B2 | * | 4/2004 | Buckland et al. | 510/439 |
| 6,749,758 B2 | * | 6/2004 | Howarth et al. | 210/746 |
| 6,802,956 B2 | * | 10/2004 | Orlebeke | 205/701 |
| 6,811,747 B2 | * | 11/2004 | Silveri | 422/12 |

* cited by examiner

*Primary Examiner*—Peter A. Hruskoci
(74) *Attorney, Agent, or Firm*—Crowell & Moring LLP; John W. Ryan

(57) ABSTRACT

A solid formulation for use with sodium chloride and a chlorine generator to provide safe, clean chlorinated recreational water. The formulation comprises a chlorine stabilizing agent and a phosphate remover agent. An enhanced salt comprising a chlorine stabilizing agent, a phosphate remover agent and sodium chloride is also described. The formulation and enhanced salt can also contain a metal chelating agent and a pH balancing agent. A cleaning agent may also be included. A fast dissolving sodium cyanurate compound is used for the chlorine stabilizing agent. A method, kit, and system for providing safe, clean chlorinated recreational water are also disclosed.

18 Claims, No Drawings

METHOD FOR PROVIDING SAFE, CLEAN CHLORINATED RECREATIONAL WATER

BACKGROUND

1. Field of the Invention

The invention relates to water sanitation and maintenance.

2. State of the Art

Swimming pools and other bodies of recreational water provide a source of entertainment for people all over the world. Whether used to cool off on a hot summer day or to swim laps for exercise, swimming pools are an important part of our culture. They offer a safe and clean environment for people, especially children, to enjoy the water even in landlocked, dry locations.

Although swimming pools have many positive characteristics, they can also be breeding grounds for bacteria and other living organisms including disease-causing microbes. Thus, in order to provide safe, sanitary, and aesthetically pleasing water, proper swimming pool maintenance must be undertaken.

The key factors in maintaining recreational water are disinfection, sanitation, oxidation, water balance, filtration, and circulation. Sanitation kills undesired living organisms in the water. Disinfection controls disease-causing microbes. Oxidation oxidizes organic and synthetic contaminants to benign forms. Water balance refers to the pH, alkalinity, and calcium water hardness. Filtration removes dead organisms and oxidized debris from the water. Circulation works with filtration to provide clean chemically treated water to all areas of the pool.

The most common agent for oxidation and sanitation is chlorine. When chlorine gas, $Cl_2$, dissolves in water, it hydrolyzes according to the reaction:

$$Cl_{2(g)} + H_2O_{(l)} \rightarrow HOCl_{(aq)} + HCl_{(aq)}$$

The chlorine of the hydrochloric acid does not contribute to the sanitation. It is the hypochlorous acid, HOCl which actually kills the microbial bodies. The bactericidal power of hypochlorous acid is attributed to its ability to defuse through cell walls and reach the vital parts of the bacteria cells. Hypochlorous acid, being a weak acid, ionizes in water according to the reaction:

$$HOCl_{(aq)} \leftrightarrows H^+_{(aq)} + OCl^-_{(aq)}$$

According to Le Chatelier's Principle, this reversible reaction will move towards equilibrium when subjected to an external change. Thus, if a product is added to the system, the reaction will shift to the left and more reactant will form. If the amount of product is reduced, the reaction will shift to the right and more product will form. Thus, if the pH of the water is lowered, making the water more acidic and raising the $H^+$ ion concentration; the equilibrium is forced to the left and more hypochlorous acid is present. Conversely, if the pH of the water is raised, the $H^+$ ion concentration is lowered and the reaction is forced to the right; forming more $OCl^-$ ion. Consequently, any free chlorine or hypochlorite added to water will immediately distribute itself into HOCl and $OCl^-$ with the ratio for the two being controlled primarily by the pH value of the water.

As a bactericide, chlorine kills unwanted organisms in water including algae and is non-toxic to humans in low concentration. Traditionally, solid chlorine tablets, liquids, and various dry compounds of chlorine have been added to pool water to maintain the recommended concentration. However, this requires daily maintenance and is very time consuming.

Due to recent improvements in process control, chlorine generators have become a popular tool in pool management. Chlorine generators, also known as salt generators, electrolytically produce pure chlorine gas form chlorine salts added to the water. Commonly, table salt or sodium chloride is used as the chlorine source for these generators. For the oxidation and sanitation steps, one simply adds an amount of sodium chloride based on the size of the pool.

Chlorine generators thus offer residential and commercial pool owners and managers a safe convenient way for maintaining the proper chlorine concentration in their pools. However, problems may be encountered when using chlorine generators. For example, it may be difficult to maintain the recommended free chlorine concentration even though the correct amount of sodium chloride was used. This is due to the free chlorine being degraded by sunlight. Ultraviolet radiation from the sun greatly depletes free chlorine in a short period of time. To reduce this depletion, a stabilizing agent or so-called conditioner is commonly added to the pool water. Cyanuric acid is by far the most commonly used stabilizing agent. This chemical assists in keeping the sanitizer in the water by preventing or slowing down the ultraviolet degradation of chlorine. The ideal concentration of cyanuric acid in the water is between 30 to 50 ppm or parts per million. Present in this concentration, cyanuric acid will keep chlorine in water 8–10 times longer than in water with no cyanuric acid. Without cyanuric acid, chlorine loss is 90 percent in just 2 hours. However, cyanuric acid is accompanied with its own issues. It is an acid so it will lower the pH of the water. It is also very slow dissolving. It can take from 4 to 7 days to dissolve in a pool depending on circulation, water balance, and water temperature. If non-dissolved cyanuric acid is left in contact with the pool vessel surface for a prolonged period of time, it can etch plaster, degrade or stretch vinyl liners, and corrode metals which can stain the swimming pool vessel surface. Further, if cyanuric acid is added through a pool's surface skimmer, as is commonly done, non-dissolved cyanuric acid can harm the metal components in the pool's plumbing and filtration system.

There are also problems encountered relating to fouling of the electrolytic plates in chlorine generators. Fouling refers to chemical buildup on the plates. The electrolytic plates are subject to shortened life spans if suntan oil, grease, soap scum, or other hydrocarbon-based synthetic personal care chemicals coat or foul the plates. The efficiency of chlorine generators are reduced if the plates become dirty. The use of an enzyme based product added to the water will help prevent the plates from getting fouled. Regular use of an enzyme in the water will also help reduce the amount of grease and oil present in the pool water.

Chlorine generator plates can also be fouled by calcium and magnesium precipitates building up on the plates. The most common buildup is calcium carbonate or so-called scale. Extreme scale buildup can bridge the distance between plates. This can cause either a short circuit or a burned area on the plate. The addition of ethylenediaminetetraacetic acid, or EDTA. is one common way of controlling scale. EDTA's main function is to prevent stains by chelating metal ions. When filling a pool for the first time or whenever a significant amount of water is added there is a risk of metallic stains. Thus, a chelating agent is commonly added while filling or soon after filling to prevent staining.

There are several other factors crucial to maintaining a safe, clean pool. For example, not only is the concentration of chlorine important for effective disinfection but also the efficacy of the chlorine. Algae greatly reduce the efficiency of chlorine in combating disease causing microbes. With algae present, the free chlorine is tied up fighting the algae and its effectiveness against other organisms is reduced. Orthophosphates are the limiting nutrient for algae growth. All phosphates in the water can degrade into orthophosphates. Thus, by reducing the phosphate concentration, the amount of algae that is capable of growing is reduced. Ideally, the phosphate concentration is kept below 100 parts per billion or ppb and most preferably kept below 50 ppb. At this concentration, only a small amount of algae is able to grow. To kill such a small population of algae, only a small amount of chlorine is needed. Thus, the remaining chlorine is free to combat other undesired organisms and the overall efficacy of the free chlorine is raised. To this end, phosphate removers are commonly added to recreational water. Phosphate removers typically include lanthanum salts and cause phosphates to precipitate out allowing them to be easily removed by filtration or vacuuming. For example, PHOSfree® of Natural Chemistry, Inc. utilizes lanthanum sulfate.

As discussed above, water balance, and especially the pH of the water, is another important factor in determining the efficacy of the free chlorine. When chlorine is added to water it forms HOCl (hypochlorous acid) which then dissociates into OCl⁻ (hypochlorite ion). HOCl is a very powerful killing form of chlorine in water. OCl⁻ is a rather weak disinfectant and is about 80 times less effective than HOCl. The percentage of each of these forms is determined by the pH of the water. At a pH of about 7.5, there is about 55 percent of the chlorine in the HOCl form and about 45 percent in the OCl⁻ form. At a pH of about 8.0, there is about 28 percent in the HOCl form and about 72 percent in the weaker OCl⁻ form. Therefore keeping the pH in the proper range renders the chlorine more powerful and efficient. In order to maintain the pH within the desired range, pH buffers are commonly added to the water.

Maintaining the proper balance between all these chemicals is no easy task for pool owners and managers. Pool owners and managers constantly over or under dose pool chemicals because most doses are calculated in ppm or mg/L (milligrams per liter) both of which are a weight-to-weight expression and they commonly use measuring cups, to measure out the chemicals, which is a volume measurement. Because of different densities, one cup of a dry chemical is not always 8 oz. dry weight. Other pool owners and managers simply guess at the weight based on a proportion of the container it is in. For instance, $\frac{1}{5}^{th}$ of a 5-pound container is about one pound.

Further, even adding the correct sodium chloride is not always an easy task. Because salt is a commodity and cheap, many pool dealers do not sell it in their stores. Many dealers send customers to home and building supply chains. Thus, there is a chance that the customer will buy the wrong kind of salt. For example, salt can be purchased with hardening agents (e.g. sodium hexametaphosphate or SHMP), cleansers (e.g. citric acid based), free-flowing/anti-caking agents (e.g. Yellow Prussiate of Soda or YPS), iron removal agents, detergents, and surfactants. While not dangerous, adding the wrong salt could reduce the life of the chlorine generator. It may also cause some staining and discoloration of the pool vessel.

In view of all the variables in maintaining safe clean swimming pool water, there is a need for simplifying pool management. Specifically, there is a need for reducing the number of steps required to effectively maintain the water in swimming pools chlorinated with chlorine generators.

SUMMARY

One embodiment of the present invention comprises a solid formulation of a stabilizing agent and a phosphate removing agent that can be easily added to a body of recreational water equipped with a chlorine generator. The formulation may further contain a metal chelating agent and a pH balancing agent. Optionally, a cleaning agent may also be included. The amount of each component within the formulation corresponds to a specific amount of water. A user simply adds the correct amount of the formulation and the correct amount of sodium chloride to the water and the chlorine generator provides safe, clean chlorinated water.

Another embodiment of the invention comprises a solid formulation comprising a stabilizing agent, a phosphate remover agent, a metal chelating agent, a pH balancing agent, and sodium chloride. The formulation may further contain a cleaning agent. The formulation can be added to a body of recreational water equipped with a chlorine generator. A user simply adds the formulation in the prescribed amount for the size of the body of water and the chlorine generator provides safe, clean chlorinated water.

Another embodiment of the present invention comprises a method for treating a body of water. The method comprises adding a solid formulation comprising a chlorine stabilizing agent, a phosphate remover agent, a metal chelating agent, a pH balancing agent, and sodium chloride to the body of water; and electrolytically converting the sodium chloride into free chlorine. The formulation that is added may further contain a cleaning agent. The method provides safe, clean chlorinated water.

Another embodiment of the invention comprises a kit for maintaining a body of recreational water. The kit includes a container holding a solid formulation made up of a stabilizing agent, a phosphate remover agent, a metal chelating agent, a pH balancing agent, and sodium chloride; and instructions for adding an effective amount of the formulation based on the size of the body of water. The formulation included in the kit may further contain a cleaning agent. A user simply adds the formulation in the prescribed amount for the size of the body of water and in combination with a chlorine generator, safe, clean chlorinated water is provided. The kit may also include testing strips for monthly testing of the water to ensure proper water chemistry is maintained.

Another embodiment of the invention comprises a system for maintaining a body of recreational water. The system includes a container holding a solid formulation made up of a stabilizing agent, a phosphate remover agent, a metal chelating agent, a pH balancing agent, and sodium chloride; instructions for adding an effective amount of the formulation based on the size of the body of water; and a chlorine generator. The formulation may further contain a cleaning agent. A user simply adds the solid formulation in the prescribed amount and the system provides safe, clean chlorinated water.

DESCRIPTION

One embodiment of the formulation of the present invention comprises a chlorine stabilizing agent, a phosphate remover agent, a metal chelating agent, and a pH balancing agent. The formulation may further contain a small amount of sodium chloride. The formulation may also contain a cleaning agent. The sodium chloride acts as a buffer between the other chemicals. The formulation is solid and can be distributed in a small package.

The chlorine stabilizing agent may be a salt of cyanuric acid. The chlorine stabilizing agent is preferably a non-chlorinated salt of cyanuric acid. The chlorine stabilizing agent is more preferably a mixture of mono-sodium, di-sodium, and tri-sodium cyanurate monohydrate. Most preferably, the mixture is highest in concentration in mono-sodium cyanurate monohydrate. The mono form has a lower pH compared to the other forms. This stabilizer is an improvement over the forms of cyanuric acid that are typically added to pool water. As detailed above, these forms of cyanuric acid are very slow dissolving and non-dissolved cyanuric acid can lead to significant problems including damage to the pool vessel surface. The cyanurate compounds used in this invention are fast dissolving and as such are not encumbered by these issues. The phosphate remover agent may comprise a partially soluble lanthanide compound. Preferably, the phosphate remover agent comprises lanthanum sulfate. The metal chelating agent is preferably EDTA. The optional cleaning agent is preferably enzyme containing.

The formulation may be pre-packaged in a convenient amount for a particular volume of water. For instance, a small bag could be used to treat 5,000 gallons of water. A user simply adds the required number of bags; say four bags for a 20,000 gallon pool. The user then adds the recommended amount of sodium chloride for use with a chlorine generator for the given pool and the chlorine generator provides safe, clean chlorinated water. Thus, the present invention greatly simplifies pool treatment management.

Another embodiment of the present invention includes an enhanced salt wherein sodium chloride is mixed in with a chlorine stabilizing agent, a phosphate remover agent, a metal chelating agent, and a pH balancing agent. The enhanced salt may also contain a cleaning agent. This embodiment of the formulation can be used directly with a chlorine generator. Thus, a user simply adds the formulation in an amount equal to the recommended amount of sodium chloride for the chlorine generator for the size of the pool and the chlorine generator provides safe, clean chlorinated water.

Another embodiment of the present invention comprises a method for treating recreational water. The method comprises adding the enhanced salt to the recreational water; and electrolytically converting the sodium chloride in the enhanced salt into free chlorine. With this method, the enhanced salt only has to be added once per month to maintain safe, clean chlorinated water.

Another embodiment of the invention comprises a kit for maintaining a body of recreational water. The kit includes a container holding a measured amount of the enhanced salt and instructions for adding an effective amount of the formulation based on the size of the body of water. A user simply adds the formulation in the prescribed amount for the size of the body of water and in conjunction with a chlorine generator; safe, clean chlorinated water is provided. The kit can also include test strips along with instructions for monthly testing to ensure all the chemicals are present in their desired concentrations.

Another embodiment of the invention comprises a system for maintaining a body of recreational water. The system includes a container holding a measured amount of the enhanced salt, instructions for adding an effective amount of the enhanced salt based on the size of the body of water, and a chlorine generator. A user simply adds the effective amount of the enhanced salt and the system provides safe, clean chlorinated water.

The formulation is formed by mixing together each solid component in the prescribed amount for a specific volume of water. For example, a specific amount of phosphate remover agent is used for a specific amount of water to provide the water with a phosphate concentration of less than 50 parts per billion. Specifically, a formulation to treat 5000 gallons of water comprises 22.5 g of lanthanum sulfate, 1.158 kg of a mixture of mono-, bi-, and tri-sodium cyanurate, and 377 g of EDTA. For 5000 gallons of water, 60.78 kg of sodium chloride are used. These amounts are based on fill water containing around 300 ppb orthophosphates which is typical. However, in different locations and under different circumstances, fill water with different concentrations of orthophosphates and other compounds could be encountered. For these situations, the formulation could contain different amounts of the chemicals or supplemental amounts of each or certain chemicals could be included in the kit. The amounts of other chemicals such as ph balancing agents and optional enzyme-based cleaning agents required for a specific volume of water are well-known and as such are not included here.

The optional solid enzyme-based cleaning agent can be formed by freeze drying liquid enzyme that is commonly used in pool maintenance. Freeze drying as opposed to flash drying or evaporating will not negatively affect the activity of the enzymes.

The several embodiments of the present invention greatly improve the efficiency of chlorine generators. By combining the treatment chemicals within a single formulation, it is ensured that the interrelated chemicals are present in the recommended amount. The cyanuric acid concentration is maintained at between 30 and 50 ppm such that the depletion of free chlorine due to ultraviolet radiation is greatly reduced. Also the mixture of mono-, bi-, and tri-sodium cyanurate monohydrate is fast dissolving and will not cause the significant problems associated with the slow dissolving forms of cyanuric acid that are typically used as a stabilizing agents. The phosphate remover agent is present in a concentration such that the phosphate concentration is maintained below 100 ppb and most preferably below 50 ppb. This is important because phosphates are the limiting nutrient for algae growth. Thus, very little algae is capable of growing in such an environment and the small amount of algae that is able to grow is easily killed by a small amount of chlorine. Since only a small amount of chlorine is needed to control the algae, there is a large amount of remaining chlorine to combat other unwanted organisms. The pH balancing agent maintains the pH within a safe range and a range such that a greater percentage of the chlorine is in the HOCl form thus increasing the efficiency of the chlorine as an oxidation agent. The metal chelating agent reduces stain formation and reduces scale buildup and fouling of the electrolytic plates of the chlorine generator, thus increasing the efficiency of the chlorine generator. EDTA is preferred over other metal chelating agents because it does not contain any compounds that breakdown into orthophosphates upon dissociation in water. Thus, the phosphate concentration is not increased by the addition of the EDTA, keeping the algae population low, and not decreasing the effectiveness of the chlorine. The optional cleaning agent keeps the plates clean thus reducing the resistance between the plates and increasing the efficiency of the chlorine generator. Enzymes are a preferred cleaning agent because they also break down organisms further taking the load off the chlorine and increasing its efficiency.

The several embodiments of the present invention greatly simplify pool maintenance for pool owners and managers. Pools are an important source of leisure and exercise and can significantly increase the value of a home but as detailed above they can also require a large amount of work. With the current invention, the time required for water maintenance is greatly reduced and the pool's real value can be realized. For example, conventionally chemicals must be added to pool water at least once per week. With the several embodiments of the present invention, one would only have to add the formulation once per month.

Although particular embodiments of this invention have been disclosed herein for purposes of explanation, further modifications or variations thereof will be apparent to those skilled in the art to which this invention pertains. For example, other additives could be included in the formulation including compounds commonly used in swimming pool water maintenance. The formulations could also contain fewer components if desired. For example, if a new pool already contains a sufficient amount of metal chelating agent it may be desirable to omit the EDTA from the formulation. Other components can be omitted for similar reasons. Thus, the scope of the present invention is only limited by the appended claims.

What is claimed is:

1. A method for purifying a body of recreational water, said method comprising the steps of:
   (a) adding to the water an effective amount of a solid formulation comprising a chlorine stabilizing agent, a phosphate remover agent, a metal chelating agent, a pH balancing agent, and sodium chloride in a chlorine generator including electrolytic plates; and
   (b) electrolytically converting the sodium chloride into free chlorine
   wherein the effective amount is calculated based on the volume of the body of recreational water and wherein the effective amount is sufficient to provide safe, clean chlorinated water with a phosphate concentration below 50 parts per billion.

2. The method of claim 1, wherein the solid formulation is added at most once per month.

3. The method of claim 1, wherein the chlorine stabilizing agent comprises a solid cyanuric acid salt.

4. The method of claim 1, wherein the chlorine stabilizing agent comprises a solid non-chlorinated cyanuric acid salt.

5. The method of claim 1, wherein the chlorine stabilizing agent comprises a mixture of mono-sodium cyanurate monohydrate, di-sodium cyanurate monohydrate, and tn-sodium cyanurate monohydrate.

6. The method of claim 1, wherein the phosphate remover agent comprises a lanthanide compound.

7. The method of claim 1, wherein the phosphate remover agent comprises lanthanum sulfate.

8. The method of claim 1, wherein the metal chelating agent comprises EDTA.

9. The method of claim 1, wherein the solid formulation further comprises an enzyme-based cleaning agent.

10. A method for purifying a body of recreational water, said method comprising the steps of:
    (a) adding to the water an effective amount of a solid formulation consisting essentially of a chlorine stabilizing agent, a phosphate remover agent, a metal chelating agent, a pH balancing agent, and sodium chloride; and
    (b) electrolytically converting the sodium chloride into free chlorine in a chlorine generator including electrolytic plates,
    wherein the effective amount is calculated based on the volume of the body of recreational water and wherein the effective amount is sufficient to provide safe, clean chlorinated water with a phosphate concentration below 50 parts per billion.

11. The method of claim 10, wherein the chlorine stabilizing agent comprises a solid cyanuric acid salt.

12. The method of claim 10, wherein the chlorine stabilizing agent comprises a solid non-chlorinated cyanuric acid salt.

13. The method of claim 10, wherein the chlorine stabilizing agent comprises a mixture of mono-sodium cyanurate monohydrate, di-sodium cyanurate monohydrate, and tn-sodium cyanurate monohydrate.

14. The method of claim 10, wherein the phosphate remover agent comprises a lanthanide compound.

15. The method of claim 10, wherein the phosphate remover agent comprises lanthanum sulfate.

16. The method of claim 10, wherein the metal chelating agent comprises EDTA.

17. The method of claim 10, wherein the step of adding to the water an effective amount of a solid formulation is performed at most once per month.

18. A method for purifying a body of recreational water, said method comprising the steps of:
    (a) adding to the water an effective amount of a solid formulation consisting essentially of a chlorine stabilizing agent, a phosphate remover agent, a metal chelating agent, a pH balancing agent, an enzyme-based cleaning agent, and sodium chloride; and
    (b) electrolytically converting the sodium chloride into free chlorine in a chlorine generator including electrolytic plates,
    wherein the effective amount is calculated based on the volume of the body of recreational water and wherein the effective amount is sufficient to provide safe, clean chlorinated water with a phosphate concentration below 50 parts per billion.

* * * * *